(12) United States Patent
Baskaran

(10) Patent No.: US 10,579,809 B2
(45) Date of Patent: Mar. 3, 2020

(54) NATIONAL IDENTIFICATION NUMBER BASED AUTHENTICATION AND CONTENT DELIVERY

(71) Applicant: SECURELYSHARE SOFTWARE PRIVATE LIMITED, Bangalore (IN)

(72) Inventor: Prakash Baskaran, Bangalore (IN)

(73) Assignee: SECURELYSHARE SOFTWARE PRIVATE LIMITED, Karnataka (IN)

( * ) Notice: Subject to any disclaimer, the term of this patent is extended or adjusted under 35 U.S.C. 154(b) by 136 days.

(21) Appl. No.: 15/947,878

(22) Filed: Apr. 9, 2018

(65) Prior Publication Data

US 2019/0311145 A1    Oct. 10, 2019

(51) Int. Cl.
| | |
|---|---|
| *G06F 21/62* | (2013.01) |
| *G06F 21/45* | (2013.01) |
| *H04L 29/06* | (2006.01) |
| *H04L 9/32* | (2006.01) |

(52) U.S. Cl.
CPC .......... *G06F 21/6209* (2013.01); *G06F 21/45* (2013.01); *H04L 9/321* (2013.01); *H04L 9/3228* (2013.01); *H04L 63/0838* (2013.01); *H04L 63/0853* (2013.01); *H04L 63/101* (2013.01); *G06F 21/6263* (2013.01)

(58) Field of Classification Search
CPC .. G06F 21/6209; G06F 21/45; G06F 21/6263; H04L 63/101; H04L 63/838; H04L 9/321; H04L 9/3228; H04L 63/0853
USPC ......................................................... 713/165
See application file for complete search history.

(56) References Cited

U.S. PATENT DOCUMENTS

| | | | | |
|---|---|---|---|---|
| 2007/0220500 A1* | 9/2007 | Saunier | ................... | G06F 21/51 717/162 |
| 2008/0028235 A1* | 1/2008 | Smith | ................... | G06F 21/575 713/190 |
| 2008/0216172 A1* | 9/2008 | Forman | ................... | G06F 21/33 726/21 |
| 2010/0125891 A1* | 5/2010 | Baskaran | ............ | G06F 21/6218 726/1 |
| 2010/0146269 A1* | 6/2010 | Baskaran | ................ | G06F 21/10 713/165 |
| 2014/0156991 A1* | 6/2014 | Baskaran | ............ | G06F 21/6209 713/165 |

(Continued)

*Primary Examiner* — Haresh N Patel
(74) *Attorney, Agent, or Firm* — Barry Choobin; Patent 360 LLC

(57) ABSTRACT

The present disclosure envisages a computer implemented method that provides an intended content recipient with selective access to an encrypted data file, subject to successful authentication of the intended content recipient's unique personal identity. An intended content recipient is enabled to create a verifiable personal identity for himself by using a National Identification Number (NIN), and link the NIN to an identifier identifying a computer-based device, so that a challenge (preferably in the form of an OTP having a time-validity) for verifying the identity of the intended content recipient could be delivered to both the mobile phone and the email ID linked to the corresponding NIN. Subsequently, when the intended content recipient authenticates himself and validates the fact that the email ID and mobile phone number linked to the NIN are indeed accessible to him, the remote server enables the intended content recipient to access the encrypted data file.

14 Claims, 2 Drawing Sheets

(56) References Cited

U.S. PATENT DOCUMENTS

Figure 1:
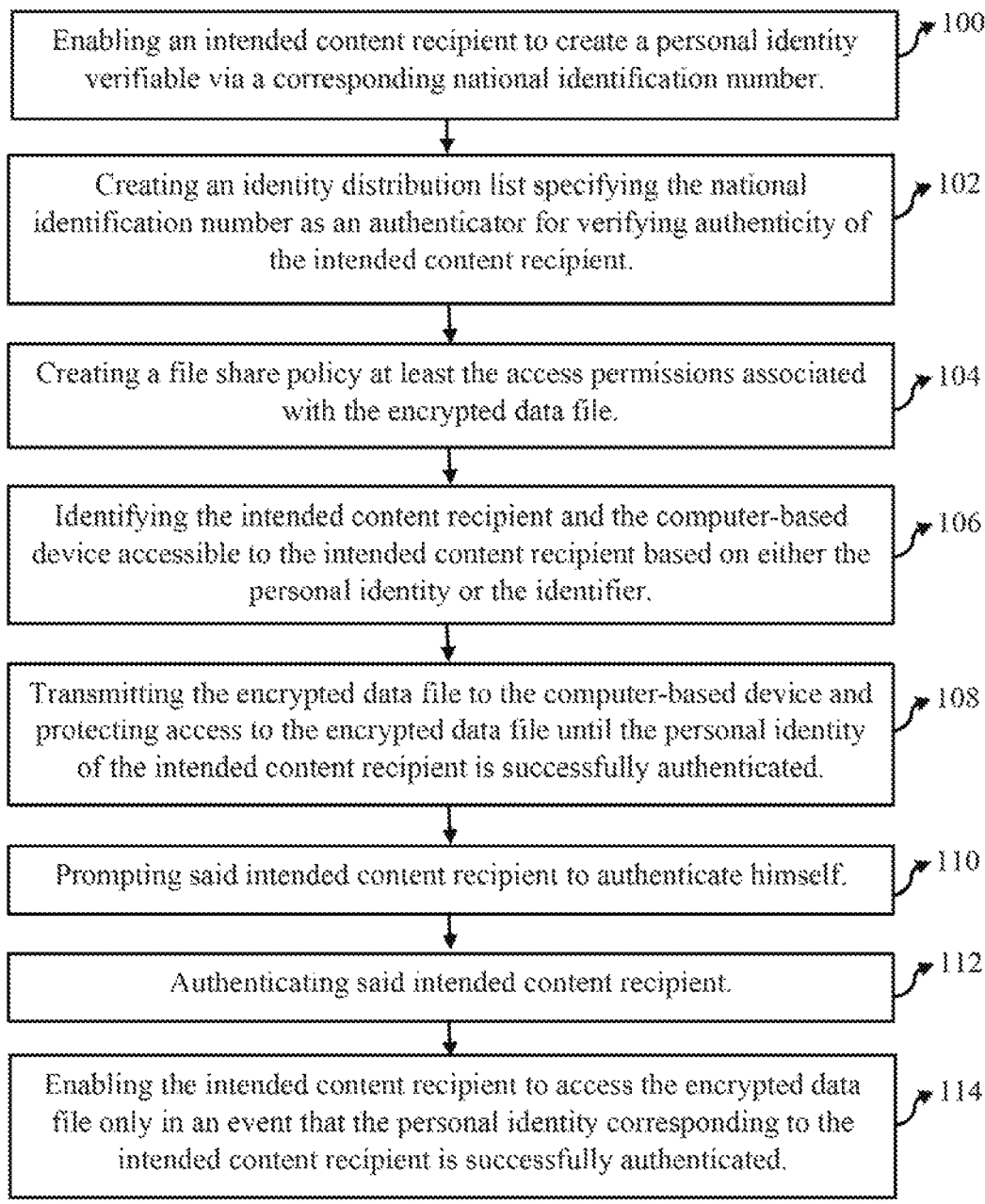

| | | | |
|---|---|---|---|
| 2014/0189352 A1* | 7/2014 | Baskaran | H04L 63/0428 713/168 |
| 2015/0020180 A1* | 1/2015 | Ngan | H04L 63/107 726/7 |
| 2015/0067802 A1* | 3/2015 | Baskaran | H04L 63/083 726/7 |
| 2016/0182495 A1* | 6/2016 | Stuntebeck | H04L 63/0846 713/156 |
| 2016/0253519 A1* | 9/2016 | Broumas | G06F 21/6245 713/189 |
| 2016/0261567 A1* | 9/2016 | Baskaran | H04L 63/0428 |
| 2017/0201518 A1* | 7/2017 | Holmqvist | G06F 21/40 |
| 2018/0278612 A1* | 9/2018 | Pattar | H04L 63/10 |
| 2018/0300493 A1* | 10/2018 | Li | G06F 21/6218 |
| 2019/0311145 A1* | 10/2019 | Baskaran | H04L 9/3228 |

* cited by examiner

NATIONAL IDENTIFICATION NUMBER BASED AUTHENTICATION AND CONTENT DELIVERY

DEFINITION OF TERMS USED IN THE PRESENT DISCLOSURE

The term 'National Identification Number (NIN)' used in the present disclosure refers to a country-specific number used to uniquely identify the citizens. The National Identification Number, in the context of the present disclosure is used to electronically establish and subsequently authenticate the identities of respective individuals. Examples of National Identification Number include but are not restricted to 'Social Security Number (SSN)' used in the USA, and 'Unique identification Authority of India. (UIDAI)' number used in India.

The term 'intended content, recipient' used in the present disclosure refers to a 'user' who is an addressee of an encrypted data file.

The term 'content creator' used in the present disclosure refers to a 'user' who creates/owns a data file and chooses to encrypt the data file (thereby creating an encrypted data file), before specifying the intended content recipient as an addressee.

BACKGROUND

Technical Field

The present disclosure relates to systems and methods used to verify the authenticity of a user. Particularly, the present disclosure relates to computer-implemented systems and methods that validate at least one personal digital identity of the user prior to providing the user with access to an encrypted document.

Description of Related Art

Nowadays, there exists a perennial need for having a robust security protocol for ensuring the safety of data/information shared over a public communication network. While access to Public communication channels such as internet is increasing every day through a myriad of devices, its use for communication beyond secure enterprise networks, through popular internet applications has become commonplace. Public communication channels such as the interact, given the fact that they are easily accessible, are at the same time more vulnerable to unauthorized access attempts and consequential misuse of sensitive data/information transmitted through the internet. To overcome at least some of the security related issues associated with sharing sensitive data/information over a public network such as the Internet, the phenomenon of 'data encryption' was conceptualized and utilized, with reasonable improvements and end-results in terms of protecting the sensitive data/information transmitted across the internet.

Various types of key based data encryption schemes have been previously envisaged and implemented in order to protect sensitive data/information from being accessed by unauthorized users having malicious intentions. One of the most popular (key-based) data encryption techniques is Data Encryption Standard (DES) encryption which proposes sharing a 'key' between a sender of sensitive data/information and a recipient intending to receive the said sensitive data/information. The key, which is preferably referred to as a 'shared secret key'—given the fact that the key is shared between the sender and recipient but is kept secret from unauthorized users is used by the sender to encrypt the data, and subsequently by the recipient to decrypt the received encrypted data. The shared secret key, as long as it remains secret (from any unauthorized user) makes decryption of the encrypted document and subsequent extraction of any useful information very difficult for an unauthorized user. The DES encryption algorithm makes it nearly impossible for an unauthorized user (hacker) to extract useful information from an encrypted document, by the way of providing for the 'key' to remain a secret shared only between the sender and the (trusted) recipient.

Yet another popular key-based data encryption technique is the Pretty Good Privacy (PGP) encryption which envisages providing the sender and the recipient with respective pairs of keys—the key pair being formed using a private key and a public key. As prescribed by PGP, the sender and recipient are aware of one another's public key while the corresponding private keys are kept secret. Typically, in any data communication method employing PGP encryption principles, the sender uses a randomly generated session key to encrypt sensitive data/information. Subsequently, the sender encrypts the session key using recipient's public key, and transmits the encrypted session key along with the encrypted sensitive data/information to the recipient. The recipient on his part uses his private key to decrypt the session key which in turn can be used to decrypt the encrypted data file. The PGP encryption algorithm makes it nearly impossible for an unauthorized user hacker) to extract useful information from an encrypted document, by the way of providing for sharing of only the public keys and by ensuring that the private keys of the sender and the recipient are always retained in strict confidentiality and not shared even between the sender and the recipient, contrary to the DES encryption algorithm.

Many such key sharing encryption schemes are being used to protect sensitive data/information from being compromised and subsequently misused while in transit from the sender to the recipient. However, one of the vulnerabilities associated with the key-based data encryption schemes is that the keys used in the process of encryption and decryption are typically stored on the computer devices of sender(s) and recipient(s) which are susceptible to hacker attacks.

Given that the keys are locally stored on computer devices, it is indeed possible for an informed hacker to employ known hacking techniques, access the computer devices storing such keys and clandestinely retrieve the keys, which could subsequently be used to crack the encryption algorithm protecting the sensitive data/information, and gain an unauthorized yet clandestine access to the sensitive data/information. Due to the aforementioned vulnerabilities associated with conventional key-based data encryption schemes, users (senders and recipients alike) are required to obtain new encryption/decryption keys periodically—which by itself is a cumbersome process, and requires elaborate record keeping efforts on the part of the users—so as to avoid at least future data/information from being accessed by a hacker who has managed to crack a previous encryption/decryption key. Even though periodically obtaining new encryption/decryption keys precludes the possibility of hacker attacks and subsequent unauthorized use of sensitive data/information to a larger extent, it does not present itself as a fool proof mechanism for preventing hacker attacks since there always exists a reasonable probability that a hacker having cracked a previous encryption/decryption key might again make a similar attempt and get successful. While technological advancements such as firewalls and anti-virus software do curtail the ability of hackers to gain unauthorized access to sensitive data/information locally stored on computer devices, there always exists a reasonable probability that the hackers would succeed in finding workarounds to defeat the firewalls and anti-virus software, and access sensitive data/information stored on computer devices.

Conventionally, firewalls and anti-virus software help protect the sensitive data/information stored on a computer device—regardless of whether the computer device is connected to the internet or otherwise—prior to the transmission of the sensitive data/information and post receiving the sensitive data/information thereto, while keys-based data encryption schemes exemplified above provide for the sensitive data/information to be secured in transit. However, due to the vulnerabilities associated with the firewalls, anti-virus software and key-based data encryption schemes discussed hitherto, there has been felt a need for an authentication system (and a method) that protects the sensitive data/information in a persistent manner, i.e., during transit and also while the said sensitive data/information is stored on computer devices. Further, there has also been felt a need for an authentication system that utilizes trustful personal identities—for example, a Social Security Number or an Identity Number accorded to the purported recipient after due scrutiny and verification—to validate the identity of the recipient before enabling the said recipient to access an encrypted data file comprising sensitive data/information.

Objects

An object of the present disclosure is to envisage an authentication system and method that provides a multi-level, security-oriented procedure for protecting the confidentiality associated with sensitive data/information.

One more, object of the present disclosure is to envisage an authentication system and method that identifies and authenticates users based on corresponding unique National Identification Numbers (NINs).

Yet another object of the present disclosure is, to envisage a non-invasive authentication system capable of trustfully authenticating a content recipient using any of the personal identities associated with the content recipient.

One more object of the present disclosure is to authenticate an intended content recipient using a corresponding unique National Identification Number (NIN), and in a manner independent of the mechanism used for delivering electronic content to the authenticated content recipient.

Another object of the present disclosure is to offer an authentication system and a corresponding method that incorporates a flexible implementation in a sense that it provides for a content recipient to be authenticated using any of the trusted universal personal identifiers.

Yet another object of the present disclosure is to facilitate trustful identification of at least one electronic device as being accessible to an intended content recipient.

One more object of the present disclosure is to bifurcate the phenomenon of content recipients' identity resolution from the aspect of securing the electronic content in transit as well as when the electronic content is stored.

Still a further object of the present disclosure is to offer an authentication system and a corresponding method that provides content recipients with selective and remotely controllable access to sensitive data/information incorporated into a data file.

Yet another object of the present disclosure is to offer an authentication system and a corresponding method that is fool proof in the sense that it enables decryption of a sensitive document subsequent to trustful authentication of the personal digital identity of the intended content recipient.

One more object of the present disclosure is to offer an authentication system that protects sensitive documents in a persistent manner, including during when sensitive documents are in transit as well as when said sensitive documents are stored in user devices.

Still a further object of the present disclosure is to provide an authentication system that is easy to be implemented and obviates the sender as well as the recipient from the hassles of managing multiple authentication keys.

SUMMARY

The present disclosure envisages a computer implemented method that provides an intended content recipient with selective access to an encrypted data file, subject to successful authentication of the intended content recipient's unique personal identity. The present disclosure also envisages a computer-implemented system and a computer program product configured to implement the method for an intended content recipient with selective access to an encrypted data file. The present disclosure has been summarized using only the implementation of the aforementioned method, since the computer-implemented system and the computer program product envisaged by the present disclosure also embody substantially similar implementations.

The method envisaged by the present disclosure enables an intended content recipient to create a verifiable personal identity for himself by using a National Identification Number—which is a country-specific unique digital identity associated with the intended content recipient—as an authenticator. For example, the National Identification Number is one of (but is not essentially restricted to) Social Security Number (SSN), Unique Identification Authority of India (UIDAI) number, National Identification Number (NIN), Social Insurance Number (SIN) and Identity Number.

Subsequent to creating a unique verifiable personal identity using any of the aforementioned variants of the 'National Identification Number', the intended content recipient is preferably prompted to link to the National Identification Number to an identifier identifying a (portable) computer-based device (for example, a PDA, a mobile phone, a note book, a laptop) accessible to the intended content recipient. The identifier linked to the National Identification Number is preferably one of a mobile phone number identifying a mobile phone accessible to the intended content recipient, and an email ID accessible to the intended content recipient.

Preferably, the intended content recipient is prompted to link his mobile phone number and email ID with the corresponding National Identification Number, so that a challenge (preferably in the form of an OTP having a time-validity) for verifying the identity of the intended content recipient could be delivered to both the mobile phone and the email ID linked to the corresponding National identification Number, during the step of authentication and prior to rendering the encrypted data file accessible to the intended content recipient.

Further, the linking of the mobile phone number and the email ID (of the intended content recipient) with the National Identification Number assigned to the intended content recipient also provides for the email ID and the corresponding mobile phone to be definitively identified (by the way of performing a challenge-response type OTP based authentication while assigning a National Identification Number to the intended content recipient) as being accessible to the intended content recipient.

Further, before sharing an encrypted data file with the intended content recipient, the method envisages creating an identity distribution list applicable to the encrypted data file. Preferably, the identity distribution list incorporates a list of personal identities (for example, retinal scan data, finger print data, National Identification Number, mobile phone number, and email ID) allowed to be used by the intended content recipient to prove his identity.

Further, the method envisages creating a file share policy preferably specifying the access permissions associated with the encrypted data file. For instance, the file share policy specifies whether the intended content recipient is allowed to only read the (encrypted) data file or read and modify the data file. Preferably, the file share policy may also specify a time-based validity associated with the encrypted date file, post which the encrypted data file is rendered inaccessible. Further, the file share policy may also specify whether the intended content recipient is allowed to transmit the encrypted data file to other users. Additionally, the file share policy may also specify whether the intended content recipient is allowed to save the encrypted data file into his computer-based device prior to either reading and/or modifying the said data file.

Preferably, the identity distribution list and the file share policy are embedded into the encrypted data file, prior to the transmission of the encrypted data file to the intended content recipient. Preferably, the encrypted data file is transmitted from a computer-based device of the content creator to a remote server and is at least temporarily stored in the remote server until a successful authentication of the intended content recipient. Alternatively, the encrypted data file is transmitted to the computer-based device of the first intended content recipient but is rendered inaccessible until the first intended content recipient validates his identity in-line with the said identity distribution list.

In the event that the encrypted data file is transmitted from the computer-based device of the content creator to the remote server, then soon after receiving the encrypted data file, the remote server triggers a Government Data Platform storing the National Identification Number of the intended content recipient and the corresponding demographic data (including the name, Date of Birth (DOB), age, residential address, mobile phone number), the fingerprints and the retinal scan data, and identifies at least the National Identification Number of the intended content recipient, and the mobile phone number and the email ID linked to the said National Identification Number.

Subsequently, the remote server establishes a connection with the mobile phone whose corresponding mobile phone number is linked to the said National Identification Number, and prompts the intended content recipient to authenticate himself prior to being enabled to access the encrypted data file. Additionally, the remote server establishes a connection with the mail server corresponding to the email ID linked to the National Identification Number and prompts the intended content recipient via an email, to prove his identity, before rendering the encrypted data file accessible. During the process of authentication (of the intended content recipient), the remote server accesses the identity distribution list and determines therefrom an allowable personal identity that the intended content recipient could use to authenticate himself. Preferably, the identity distribution list specifies the 'National Identification Number' as the only allowable authenticator, and subsequently the intended content recipient is triggered to verify his personal identity using his National Identification Number.

Subsequently, when the intended content recipient authenticates himself and validates the fact that the email. ID and mobile phone number linked to the National Identification Number are indeed accessible to him—by the way of successfully reproducing the OTP—the remote server enables the intended content recipient to access the encrypted data file, i.e. to preferably download the encrypted data file onto the corresponding computer-based device and process the file in accordance with the file share policy.

BRIEF DESCRIPTION OF THE ACCOMPANYING DRAWINGS

Figure 2:
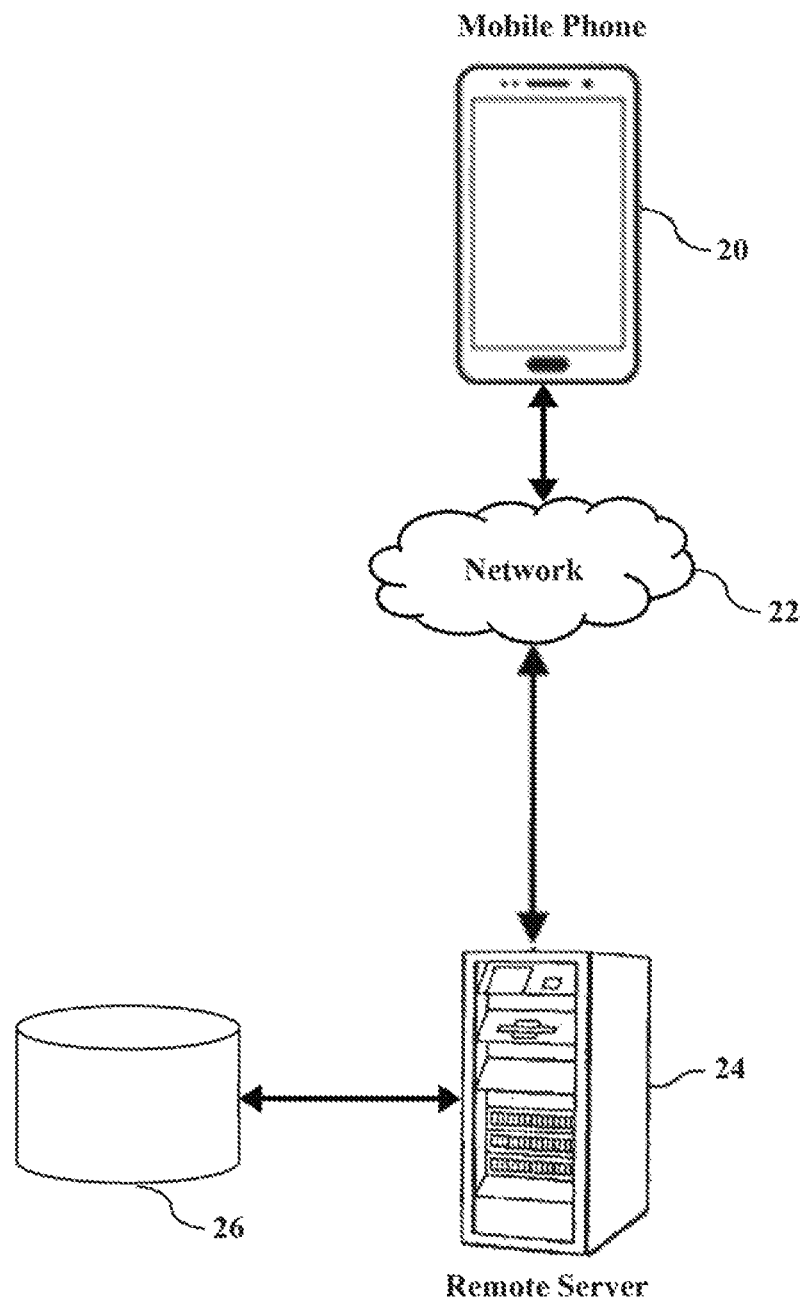

FIG. 1 is a flow-chart illustrating the steps involved in the computer-implemented method for providing content recipients with selective access, to an encrypted data file; and FIG. 2 is a block diagram describing the computer-implemented system, in accordance with the present disclosure.

DETAILED DESCRIPTION

The present disclosure envisages a computer-implemented method for providing an intended content recipient with selective access to an encrypted data file, with the access to the encrypted data file being granted to the intended content recipient only after his (personal) identity has been duly authenticated.

FIG. 1 of the present disclosure describes the steps involved in the computer implemented method for providing content recipients with selective access to an encrypted data file. The implementation of the said computer implemented method begins with the launch of a computer program product embodying computer readable instructions which when executed by a computer processor—which is a part of a computer implemented system envisaged by the present disclosure—cause the computer processor to sequentially implement all the steps described as a part of the said computer implemented method.

At step 100, the processor (not shown in figures) executing the computer implemented method in the form of computer readable instructions, enables the intended content recipient to associate his personal digital identity with a 'National Identification Number', and to further use the said National Identification Number for validating his identity. Further, step 100 also describes linking the 'National Identification Number' of the intended content recipient with a computer based device (preferably a portable computer based device including but not restricted to a PDA, a cell phone, a mobile phone/smart phone and a note book) accessible to the intended content recipient and identifiable as belonging to the intended content recipient, via a unique identifier (for example, a mobile phone number provided by a service provider responsible for providing wireless services on the mobile phone accessible to the intended content recipient. Further, the National Identification Number corresponding to the intended content recipient is also linked to an email ID which could be accessed by the intended content recipient via the said computer-based device).

Preferably, the National Identification Number of the intended content recipient is digitally linked to the identifier (preferably, to both the mobile phone number and the email ID provided by the intended content recipient while availing the National Identification Number) that identifies the computer-based device as belonging to and accessible to the intended content recipient. Preferably, the mobile phone number linked to the National Identification Number identifies the computer-based device (cell phone/mobile phone/ smart phone) accessible to the intended content recipient, while the email ID linked to the National Identification Number is preferably rendered accessible to the intended content recipient, via the said computer-based device.

As described in step 100, the intended content recipient and specifically the identity of the intended content recipient is verified using the National Identification Number which acts as a personal digital identity for the intended content recipient. Preferably, the 'National identification Number'—accorded to the intended content recipient by authorized Government authorities, and considered as a valid and fool-proof benchmark for verifying the authenticity of the intended content recipient—one of a Social Security Number (SSN), a Social Insurance Number (SIN), an Identity Number and a unique-identity number provided by the Unique identification Authority of India (UIDAI).

In an exemplar embodiment of the present disclosure, the process of obtaining a National identification Number preferably begins with the intended content recipient undergoing a 'Registration' process during which he provides at least one Proof of Address (POA) and at least one Proof of identity documents—to the authorized Government authorities—thereby validating his address and his identity respectively. The 'Registration' process also requires the intended content recipient to provide his demographic data including name, Date of Birth (DOB), age, residential address, mobile phone number (identifying a mobile phone accessible to the intended content recipient) and an email ID. The 'Registration' process terminates with the intended content recipient providing his finger prints and retinal scan data. Preferably, subsequent to successful completion of the 'Registration' process, the demographic data (including the name, Date of Birth (DOB), age, residential address, mobile phone number), the fingerprints and the retinal scan data of the intended content recipient are securely stored on a Government Data Platform (denoted by reference numeral 26 in FIG. 2). With the successful completion of the 'registration' process, the intended content recipient is accorded a National Identification Number, which in-turn acts as a single source for online identity verification of the intended content recipient, allowing the intended content recipient to authenticate and establish his identity using at least one of his mobile phone number and the email ID which are digitally linked to the corresponding National Identification Number.

In accordance with the preferred embodiment of the present disclosure, the National Identification Number assigned to the intended content recipient is linked, preferably digitally, to a mobile phone number identifying a mobile phone/smart phone accessible to the intended content recipient, so that the verification of the of the National identification Number is designated to provide for an identification and verification of the authenticity the intended content recipient, while the step of linking (as described in step 100) the unique identifier identifying the mobile phone accessible to the intended content recipient with the National Identification Number, provides for verifying whether the said mobile phone is truly accessible to and associated with the intended content recipient. Further, the National identification Number assigned to the intended content recipient is also linked, preferably digitally, to an email ID corresponding to the intended content recipient.

Preferably, during the step of authentication, the intended content recipient is prompted to input (preferably via his mobile phone having a phone number digitally linked to the National Identification Number) his National Identification Number. While it is preferred that the intended content recipient inputs his National identification Number via his mobile phone whose number has been digitally linked to the National Identification Number, it is possible that any secured computer-based device could be used by the intended content recipient to input his National identification Number.

Subsequently, a look-up is performed on the Government Data Platform securely storing the demographic data, fingerprints and retinal scan data of the intended content recipient, and the mobile phone number digitally linked to the National identification Number is elicited from the Government Data Platform. Preferably, the email ID digitally linked to the National Identification Number is also elicited from the Government Data Platform.

Subsequently, a One-Time Password (OTP) having a limited time validity is electronically transmitted to the email ID and the mobile phone—with the mobile phone being identified based on the mobile number elicited from the Government Data Platform. The intended content recipient is subsequently instructed to reproduce the electronically transmitted OTP along with his National identification Number, for his identity to be successfully authenticated.

At step 102 the present disclosure envisages creating an 'identity distribution list' corresponding to the intended recipient and applicable to the encrypted document that the intended content recipient wishes to access. In accordance with the present disclosure, the identity distribution list incorporates information pertinent to the personal identities and the corresponding authenticators allowed to be used by the intended content recipient to prove his identity.

Preferably, the identity distribution list specifies personal identities including but not restricted to a device ID, International Mobile Station Equipment Identity (IMEI) number, a mobile phone number, an email ID, an OAuth principal ID, National Identification Number, finger prints and retinal scan data as allowable for verifying/authenticating the identity of the intended content recipient. In accordance with the present disclosure, any of the (aforementioned) personal identities specified in the identity distribution list could be used by the intended content recipient to authenticate his identity and subsequently access the encrypted data file. However, the preferred embodiment of the present disclosure envisages the use of the 'National Identification Number' corresponding to the intended content recipient as an authenticator for authenticating the identity of the intended content recipient, since 'National identification Number' based authentication mechanism requires one time registration, is, easy to implement, fool-proof, and also since it authenticates an intended content recipient based on his most frequently used digital identity i.e., the mobile phone number which in-turn identifies a mobile phone to be associated with the intended content recipient.

Further, at step 104, the present disclosure envisages selectively creating a file share policy corresponding to the encrypted data file. The file share policy preferably specifies the access permissions associated with the encrypted data file. For instance, the file share policy may specify whether the intended content recipient is allowed to only read the (encrypted) data file or read and modify the data file. Preferably, the file share, policy may also specify a time-based validity associated with the encrypted data file, post which the encrypted data file is rendered inaccessible despite a positive authentication of the identity of the intended content recipient. Further, the file share policy may also specify whether the intended content recipient is allowed to electronically share the encrypted data file with other users. Additionally, the file share policy may also specify whether the intended content recipient is allowed to save the encrypted data file into his computer-based device prior to either reading and/or modifying the said data file.

Further, the fact that the 'National Identification Number' is digitally linked to the mobile phone number of the intended content recipient, makes it possible for a content creator to transmit the encrypted data file to the intended content recipient (as described in step 106) using either the National Identification Number corresponding to the intended content recipient or the mobile phone number corresponding to the intended content recipient—which is in turn preferably linked to the National identification Number. The present disclosure, by emphasising on the use of National Identification Number for identifying as well as authenticating the intended content recipient, provides for the documents (i.e. encrypted data file) to be electronically transmitted to the intended content recipient without requiring the use of either the email ID or the mobile phone of the intended content recipient, thereby providing an alternative and secured mode for identifying to intended content recipient.

In accordance with the present disclosure, the content creator, from his computer-based device—which has been specifically configured to electronically transmit encrypted data files using the National identification Number as a mode of identification of the intended content recipient—inputs the National identification Number of the intended content recipient and subsequently the encrypted data file is delivered either to the mobile phone accessible to the intended content recipient—with the mobile phone number identifying the mobile phone being digitally linked to the National Identification Number, or to the email ID digitally linked to the National Identification Number. However, in accordance with the preferred embodiment of the present disclosure, the encrypted data file is delivered to both the mobile phone and the email ID corresponding to the intended content recipient.

In accordance with the preferred embodiment of the present disclosure, the creation of the 'file share policy' is optional. Preferably, the identity distribution list, and the file share policy are embedded into the encrypted data file prior to the said file being transmitted to the intended content recipient. Alternatively, the identity distribution list, and the file share policy are stored on a remote server (denoted by reference numeral 24 in FIG. 2) and accessed from the computer-based device of the intended content recipient, soon after the server triggers the computer-based device of the intended content by the way of transmitting a web-based link to the computer-based device informing the intended content recipient about the availability of an encrypted data file. Preferably, the web-based link, when activated by the intended content recipient on his computer-based device, prompts the intended content recipient to initiate the process of getting his (digital) identity authenticated.

In accordance with the preferred embodiment of the present disclosure, the encrypted data file, subsequent to being transmitted from the computer-based device of the content creator, is received at the remote server, which in-turn stores the encrypted data file, and protects the encrypted data file from being accessed, (even by the intended content recipient to whom it has been addressed) by rendering the encrypted data file inaccessible until the identity of the intended content recipient is successfully authenticated using the National identification Number.

At step 108, in accordance with the preferred embodiment of the present disclosure, the remote server triggers the computer-based device of the intended content recipient by transmitting the web-based link thereto, which in turn notifies the intended content recipient about the availability of an encrypted data file and also prompts the intended recipient to authenticate himself using his National Identification Number before being allowed to access the encrypted data file.

At step 110, soon after the intended content recipient is prompted to use his National Identification Number to authenticate his identity, the processor accesses the identity distribution list which is either embedded into the encrypted data file or stored on the remote server, and identifies the various personal identities that the intended recipient could use to authenticate his identity. As described in earlier paragraphs, the preferred embodiment of the present disclosure envisages using the 'National Identification Number' as an authenticator for verifying/authenticating the identity of the intended content recipient, and for deciding about whether to render the encrypted data file accessible to the intended content recipient. Further, if the encrypted data file is determined (by the processor) as incorporating a file share policy, then the processor renders the encrypted data file accessible to the intended content recipient in-line with the said file share policy, post a successful authentication of the identity of the intended content recipient in-line with the identity distribution list, and assigns to the intended content recipient, only the access permissions specified in the file share policy.

Preferably, during the step of authentication, the intended content recipient is prompted to input (preferably via his mobile phone having a phone number digitally linked to the National Identification Number) his National identification Number. While it is preferred that the intended content recipient inputs his National identification Number via his mobile phone whose number has been digitally linked to the National Identification Number, it is possible that any secured computer-based device could be used by the intended content recipient to input his National Identification Number.

Subsequently, a look-up is performed on the Government Data Platform securely storing the demographic data, fingerprints and retinal scan data of the intended content recipient, and the mobile phone number digitally linked to the National Identification Number is elicited from the Government Data Platform. Further, the email ID digitally linked to the National Identification Number is also elicited from the Government Data Platform.

Subsequently, a One-Time Password (OTP) having a limited time validity is electronically transmitted to the email ID and the mobile phone with the mobile phone being identified based on the mobile number elicited from the Government Data Platform. The intended content recipient is subsequently instructed to reproduce the electronically transmitted OTP along with his National Identification Number, for his identity to be successfully authenticated.

Subsequently, at step 112, the intended content recipient is prompted to re-transmit the OTP received earlier, back to the remote server for verification. Subsequently, if the processor, determines that the OTP initially generated by the processor matches with the OTP retransmitted by the intended content recipient, then the processor determines the intended content recipient to be a rightful addressee of the encrypted date file, while successfully authenticating the identity of the intended content recipient. Subsequently, at step 114, post a successful authentication of the intended content recipient, the encrypted data file is rendered accessible to the intended content recipient. Preferably, the encrypted data file is rendered accessible to the intended content recipient via either the email-ID linked to the National Identification Number and via a mobile phone identified by the mobile phone number linked to the National Identification Number.

Referring to FIG. 2, there is shown a block diagram 200 describing the computer-implemented system in accordance with another embodiment of the present disclosure, wherein the mobile phone/smart phone 20 accessible to the intended content recipient and identifiable via a corresponding mobile phone number linked to the National identification Number, is specifically programmed preferably using executable software instructions—to provide the intended content recipient with selective access to encrypted data files. In accordance with the present disclosure, the executable software instructions are preferably computer readable instructions embodied into a software application configured to be executed by a processor (not shown in figures) embedded onto the mobile phone 20 accessible to the intended content recipient.

Typically, the execution of the computer readable instructions by the processor begins with the intended content recipient downloading the corresponding software application and registering himself with the downloaded software application. During the process of registration, the intended content recipient provides details including but not restricted to the first name, last name, an email ID, a mobile phone number and a National Security Number (NIN). It is preferable that the email ID and the mobile phone number provided by the intended content recipient during 'registration' with the software application are the same as the mobile phone number and the email ID linked to the National Identification Number when the intended content recipient went through the process of obtaining the said National Identification Number.

The intended content recipient requests for 'registration' with the said software application, and provides his first name, last name, the National identification Number, and the mobile phone number and Email ID linked to the National identification Number. Subsequently, the credentials provided by the user are electronically transmitted by the processor to the remote server 24 via a network 22. Preferably, the remote server is designated to store the said credentials in addition to managing and assisting the execution of the said software application on the mobile phone 20 accessible to the intended content recipient.

The remote server 24 analyses the received credential and identifies at least the National Identification Number corresponding to the intended content recipient. Further, the remote server 24 triggers the Government Data Platform 26 and performs a lookup for the National Identification Number provided by the intended content recipient. Following a successful lookup of the National identification Number on the Government Data Platform 26, the remote server 24 elicits the mobile phone number and the Entail ID linked to the National Identification Number.

Subsequent to eliciting the mobile phone number and the Email ID linked to the National identification Number, the remote server 24 establishes an electronic communication with the mobile phone 20—whose corresponding mobile phone number was linked to the National Identification Number—and transmits to the mobile phone 20 a One-Time Password (OTP) having a predetermined time validity. Preferably, the remote server 24 also establishes an electronic communication with the email server (not shown in figures) operating the entail ID linked to the National Identification Number of the intended content recipient, and transmits the same OTP with the same time-validity, to the entail server, which in turn renders the OTP accessible to the intended content recipient via his email ID (the email ID which is linked to the National Identification Number of the intended content recipient). The remote server 24, by the way of transmitting the OTP, attempts to validate a virtual link between the mobile phone and email ID accessible to the intended content recipient and the National Identification Number assigned to the intended content recipient (the virtual link which would have been created during the process of 'registration').

Subsequent to delivering the OTP to the mobile phone 20 based on the corresponding mobile phone number) and the email ID linked with the National Identification Number, the remote server 24 triggers the software application—executed on the mobile phone 20 of the intended content recipient to prompt the intended content recipient to reproduce the OTP. The intended content recipient reproduces the OTP—preferably by the way of keying-in the OTP via a digital user interface (not shown in figures) displayed on the mobile phone 20 as a consequence of execution of the said software application. Subsequently, the remote server 24 compares the OTP reproduced by the intended content recipient with the OTP originally sent to the intended content recipient, and in case of a successful match, positively authenticates the identity of the intended content recipient, and registers the intended content recipient as a trustful user of the software application.

The remote server 24 notifies the software application (executed by the mobile phone accessible to the intended content recipient) about the positive authentication of the identity of the intended content recipient, and the successful registration of the intended content recipient as a trustful user of the software application. Further, by the way of registration, the remote server 24 reconfirms a trustful, association between the National Identification Number (assigned to the intended content recipient) and the mobile phone number and the email ID linked to the National identification Number. The (process of) registration of the intended content recipient with the remote server 24 also enables the remote server 24 to trustfully identify the mobile phone 20—whose corresponding mobile phone number is linked with the National Identification Number—and the email ID as being accessible to the intended content recipient.

Subsequent to receiving such a notification from the remote server 24, the software application triggers the processor (of the mobile phone accessible to the intended content recipient, and on which the said software application is executed) to display a list of encrypted data files addressed to the intended content recipient. When the intended content recipient chooses to access any of the listed encrypted data files, the processor analyses the identity distribution list and file share policy corresponding to the chosen encrypted data file and prompts the intended content recipient to authenticate himself in-line with the identity, distribution list embedded with the encrypted date file, i.e. authenticate himself using the corresponding National Identification Number (as described in step 110). Subsequent to a successful authentication of the intended content recipient based on the corresponding National Identification Number (described in detail in steps 110 and 112), the encrypted data file is rendered accessible to the intended content recipient on the mobile phone 20 linked to the National Identification Number and executing the said software application.

In accordance with another embodiment of the present disclosure, it is possible that the intended content recipient uses a computer-based device such as a laptop computer or a desktop computer (not shown in figures) to download the said software application and registering himself with the downloaded software application. In such a case, the execution of the computer readable instructions embodied in the said software application is managed by a processor embedded into the computer-based device, and the OTP is delivered to the email ID of the intended content recipient, which is accessible via the computer-based device. The remaining steps/procedures are implemented in a manner similar to the description provided for FIG. 2.

Technical Advantages

The technical advantages envisaged by the present disclosure include the realization of a computer implemented system and method that offers a multi-layered security-oriented procedure for protecting the confidentiality associated with sensitive data/information. The present disclosure also envisages a non-invasive authentication system capable of trustfully authenticating a content recipient using any of the personal identities associated with the content recipient. Further, the system and method envisaged by the present disclosure embody a flexible implementation which provides for a content recipient to be authenticated using any of the trusted universal personal identifiers.

The authentication system and the corresponding method envisaged by the present disclosure provide content recipients with selective and remotely controllable access to sensitive data/information incorporated into a data file. The authentication system is also fool proof in the sense that it enables decryption of a sensitive document only based on the trustful personal digital identity associated with the content recipient. Further, the authentication system and method protect sensitive documents in a persistent manner, thereby continually protecting the sensitive document while it is stored on a computer device and also while on transit from a sender to a receiver and also while it is stored on a cloud-based platform. Further, the authentication system and method envisaged by the present disclosure entail an easy implementation and integration with varying types of computer-based devices and also obviate the sender as well as the recipient from the hassles of managing multiple authentication keys.

What is claimed is:

1. A computer implemented method for providing content recipients with selective access to an encrypted data file, said method comprising the following computer-implemented steps:

enabling an intended content recipient to create a personal identity verifiable via a corresponding National identification Number, and further enabling said intended content recipient to link said National Identification Number to an identifier trustfully identifying a computer-based device accessible to said intended content recipient;

creating an identity distribution list corresponding to the encrypted data file, said identity distribution list specifying at least one trusted authenticator usable for verifying said personal identity corresponding to said intended content recipient, and further configuring said identity distribution list to specify said National Identification Number as said trusted authenticator;

selectively embedding said identity distribution list into the encrypted data file, and transmitting the encrypted data file to said computer-based device accessible to said intended content recipient, said computer-based device identified based on at least one of said National Identification Number corresponding to said intended content recipient, and said identifier linked to said National Identification Number, specified by a sender of the encrypted data file;

protecting the access to the encrypted data file on said computer-based device until the personal identity corresponding to said intended content recipient is successfully authenticated in-line with said identity distribution list;

analyzing said identity distribution list to identify said trusted authenticator specified therein and prompting said intended content recipient to authenticate himself using said personal identity verifiable via said National Identification Number, in-line with said identity distribution list;

authenticating said personal identity of said intended content recipient, based on said National identification Number corresponding to said intended content recipient; and enabling said intended content recipient to access the encrypted data file only in an event that the personal identity corresponding to said intended content recipient is successfully authenticated.

2. The method as claimed in claim 1, wherein the step of prompting said intended content recipient to create said personal identity verifiable via a National Identification Number, further includes the step of prompting said intended content recipient to create said personal identity verifiable via at least one of a corresponding Social Security Number (SSN), Unique identification Authority of India (UIDAI) number, Social Insurance Number (SIN) and Identity Number.

3. The method as claimed in claim 1, wherein the step of creating an identity distribution list further includes the step of configuring said identity distribution list to specify a plurality of alternative personal identities and corresponding authenticators, in addition to said National Identification Number, for verifying authenticity of said intended content recipient.

4. The method as claimed in claim 3, wherein the step of configuring said identity distribution list to specify a plurality of alternative personal identities further includes the step of automatically linking each of said plurality of alternative personal identities to said corresponding authenticators including a device ID, an international Mobile Station Equipment Identity (IMEI) number and a mobile phone number.

5. The method as claimed in claim 1, wherein the step of authenticating said personal identity of said intended content recipient, based on said National Identification Number corresponding to said intended content recipient, further includes the following steps:

generating a unique one-time password (OTP), and transmitting said OTP to said computer-based device accessible to said intended content recipient, said computer-based device identified based on said identifier linked to said National Identification Number;

prompting said intended content recipient, via said computer-based device, to output a response code subsequent to receiving said OTP;

comparing said OTP with said response code, and in case of a match between said OTP and said response code, indicating a successful authentication of said personal identity corresponding to said intended content recipient.

6. The method as claimed in claim 1, wherein the step of enabling said intended content recipient to link said National Identification Number to an identifier trustfully identifying a computer-based device accessible to said intended content recipient, further includes the step of enabling said intended content recipient to link said National Identification Number to at least one of a mobile phone number trustfully identifying said computer-based device, and an email ID accessible to said intended content recipient.

7. A computer implemented system for providing an intended content recipient with selective access to an encrypted data file, said system comprising:
a memory module;
a processor communicably coupled to said memory module, said processor configured to:
enable an intended content recipient to create a personal identity verifiable via a corresponding National Identification Number, and further enable said intended content recipient to link said National Identification Number to an identifier trustfully identifying a computer-based device accessible to said intended content recipient;
create an identity distribution list corresponding to the encrypted data file, said identity distribution list specifying at least one trusted authenticator usable for verifying said personal identity corresponding to said intended content recipient, and further configure said identity distribution list to specify said National Identification Number as said trusted authenticator;
selectively embed said identity distribution list into the encrypted data file, and transmit the encrypted data file to said computer-based device accessible to said intended content recipient, said computer-based device identified based on at least one of said National Identification Number corresponding to said intended content recipient and said identifier linked to said National Identification Number, specified by a sender of the encrypted data file;
transmit the encrypted data file to said computer-based device accessible to said intended content recipient, and protect the access to the encrypted data file on said computer-based device until said personal identity corresponding to said intended content recipient is successfully authenticated in-line with said identity distribution list;
analyze said identity distribution list to identify said trusted authenticator specified therein and prompt said intended content recipient to authenticate himself using said personal identity verifiable via said corresponding National Identification Number, in-line with said identity distribution list;
authenticate said personal identity of said intended content recipient, based on said National Identification Number corresponding to said intended content recipient; and
enable said intended content recipient to access the encrypted data file only in an event that the personal identity corresponding to said intended content recipient is successfully authenticated.

8. The system as claimed in claim 7, wherein said processor is further configured to verify said personal identity via at least one of a corresponding Social Security Number (SSN), Unique Identification Authority of India (UIDAI) number, Social Insurance Number (SIN) and Identity Number.

9. The system as claimed in claim 7, wherein said identity distribution list is further configured by said processor to specify a plurality of alternative personal identities and corresponding authenticators, in addition to said National Identification Number, for verifying authenticity of said intended content recipient.

10. The system as claimed in claim 9, wherein the processor is further configured to automatically link each of said plurality of alternative personal identities to said corresponding authenticators including a device ID, an International Mobile Station Equipment identity (IMEI) number, and a mobile phone number.

11. The system as claimed in claim 7, wherein the processor is further configured to:
generate a unique one-time password (OTP), and transmit said OTP to said computer-based device accessible to said intended content recipient, said computer-based device identified based on said identifier linked to said National Identification Number;
prompt said intended content recipient, via said computer-based device, to output a response code subsequent to receiving said OTP;
compare said OTP with said response code, and in case of a match between said OTP and said response code, indicate a successful authentication of said personal identity corresponding to said intended content recipient.

12. The system as claimed in claim 7, wherein said identifier is at least one of a mobile phone number trustfully identifying said computer-based device accessible to said intended content recipient, and an email ID accessible to said intended content recipient.

13. A non-transitory computer readable storage medium having computer-readable instructions stored thereupon, the instructions when executed by the processor cause the processor to:
enable an intended content recipient to create a personal identity verifiable via a corresponding National Identification Number, and further enable said intended content recipient to link said National Identification Number to an identifier trustfully identifying a computer-based device accessible to said intended content recipient;
create an identity distribution list corresponding to the encrypted data file, said identity distribution list specifying at least one trusted authenticator usable for verifying said personal identity corresponding, to said intended content recipient, and further configure said identity distribution list to specify said National Identification Number as said trusted authenticator;
selectively embed said identity distribution list into the encrypted data file, and transmit the encrypted data file to said computer-based device accessible to said intended content recipient, said computer-based device identified based on at least one of said National Identification Number corresponding to said intended content recipient, and said identifier linked to said National Identification Number, specified by a sender of the encrypted data file;
transmit the encrypted data file to said computer-based device accessible to said intended content recipient, and protect the access to the encrypted data file on said computer-based device until the personal identity corresponding to said intended content recipient is successfully authenticated in-line with said identity distribution list;

analyze said identity distribution list to identify said trusted authenticator specified therein and prompt said intended content recipient to authenticate himself using said personal identity verifiable via said corresponding National Identification Number, in-line with said identity distribution list;

authenticate said personal identity of said intended content recipient, based on said National Identification Number corresponding to said intended content recipient; and enable said intended content recipient to access the encrypted data file only in an event that the personal identity corresponding to said intended content recipient is successfully authenticated.

14. The computer-readable instructions as claimed in claim 13, wherein the computer-readable instructions when executed by the processor, further cause the processor to:

enable said intended content recipient to link said National Identification Number to a mobile phone number trustfully identifying said computer-based device;

verify said personal identity via at least one of a corresponding Social Security Number (SSN), Unique identification Authority of India (UIDAI) number, Social Insurance Number (SIN) and Identity Number;

configure said identity distribution list to specify a plurality of alternative personal identities and corresponding authenticators, in addition to said National identification Number, for verifying authenticity of said intended content recipient;

automatically link each of said plurality of alternative personal identities to said corresponding authenticators including a device ID, an international Mobile Station Equipment Identity (IMEI) number, and a mobile phone number;

generate a unique one-time password (OTP), and transmit said OTP to said computer-based device accessible to said intended content recipient, said computer-based device identified based on said identifier linked to said National Identification Number;

prompt said intended content recipient, via said computer-based device, to output a response code subsequent to receiving said OTP; and compare said OTP with said response code, and in case of a match between said OTP and said response code, indicate a successful authentication of said personal identity corresponding to said intended content recipient.

* * * * *